United States Patent Office 3,635,891
Patented Jan. 18, 1972

3,635,891
INTERNALLY PLASTICIZED POLYIDENE RESINS
Hyman R. Lubowitz, Hawthorne, and Eugene A. Burns, Palos Verdes Peninsula, Calif., assignors to TRW Inc., Redondo Beach, Calif.
No Drawing. Continuation-in-part of application Ser. No. 565,074, July 14, 1966. This application Nov. 13, 1969, Ser. No. 876,580
Int. Cl. C08g 22/08
U.S. Cl. 260—47 EP   18 Claims

ABSTRACT OF THE DISCLOSURE

Thermosetting polydiene resins may be modified by the inclusion of plasticizers to produce more versatile resins having widely variant properties. Thermosetting 1,2-polybutadiene or 3,4-polyisoprene resins may be modified by the inclusion of an organic compound having at least one reactive vinyl group.

This application is a continuation-in-part of application Ser. No. 565,074, filed July 14, 1966 and now abandoned. Processing of the prior art thermosetting resins has certain inherent difficulties and disadvantages. Most thermosetting resins are transformed during cure from a liquid prepolymer directly to a solid state. Difficulty arises where, for example, a vertical surface is to be coated with a thermosetting plastic, the liquid prepolymer is spread over the surface, and unless the polymer cures almost instantaneously or is extremely viscous, it will run and become uneven. Similar problems arise in castings. Unless a rapid cure is effected on the liquid prepolymer, special castings may have uneven thicknesses making them unsuitable for their intended purpose. This invention overcomes these disadvantages.

In general, the internally plasticized resins according to this invention are produced by incorporating an organic compound having a reactive vinyl group into a mixture comprising a predominant amount of 1,2-polybutadiene, an organic chain extender, and a peroxide intiator. The reactive vinyl group on the organic plasticizer provides additional crosslinking between the polybutadiene chains. The cured plasticized compounds possess improved thermal shock resistance and reduced hardness.

Polydiene prepolymers used in production of the thermosetting resinous forms of this invention should have predominantly pendant vinyl groups on alternate carbon atoms of the backbone carbon chain, preferably constituting at least 80% of the olefinic unsaturation, and should preferably have a molecular weight from about 500 to about 3000, although higher molecular weights may be used in viscosity is no problem. The preferred polydiene is 1,2-polybutadiene, although 3,4-polyisoprene is also suitable. Difunctional compounds characterized by terminal substitution are preferred, however, other polyfunctional prepolymers having functional groups located at opposite ends of the molecule, but not necessarily the terminal positions, may be used. While a dihydroxy substituted prepolymer is generally preferred, mainly from the standpoint of ease of reatability, dicarboxy substituted compounds or other polydienic prepolymer having chemically functional groups preferably terminally positioned will also be satisfactory. Polymers having a functionality of 2 is preferred, however, processing conditions may be adjusted to accommodate the use of polymers having any functionality greater than 1.

Selection of a suitable organic chain extender is dependent upon the functional groups on the prepolymers. Where the functional groups on the prepolymers are hydroxyl, chain extenders should be diisocyanates, diacid halides, diacids, or diesters. Where the functional groups on the prepolymers are carboxyl, the chain extenders should be diepoxides, diamines, diols, and diaziridenes. Where the functional groups on the prepolymers are amino, the chain extenders should be diisocyanates, anhydrides, dianhydrides, dicarboxylic acids, diacid halides, diesters, and diepoxides. The aliphatic or aromatic organic chain extenders are preferably difunctional, but may contain more than two functional groups.

Typical diisocyanate compounds which may be used as chain extenders in the process of this invention are:

TABLE I (1) 2,4-toluene diisocyanate
(2) Hexamethylene diisocyanate
(3) 2,6-toluene diisocyanate
(4) Dianisidine diisocyanate
(5) 1,4-benzene diisocyanate
(6) p,p'-diisocyanate diphenyl methane
(7) 1-chlorophenyl-2,4-diisocyanate
(8) Trimethylene diisocyanate
(9) Pentamethylene diisocyanate
(10) Butylene-1,2-diisocyanate
(11) Butylene-1,4-diisocyanate
(12) Xylene diisocyanate
(13) 2,4-cyclohexylene diisocyanate
(14) 1,1-dibutyl ether diisocyanate
(15) 1,6-cyclopentane diisocyanate
(16) 2,5-indene diisocyanate
(17) Diphenylmethane diisocyanate
(18) 1,5-naphthalene diisocyanate
(19) Triphenylmethane diisocyanate Typical acids and anhydride chain extenders which may be employed in this invention are:

TABLE II (1) Adipic acid
(2) Fumaric acid
(3) 1,4-cyclohexanedicarboxylic acid
(4) Terephthalic acid
(5) Malonic acid
(6) Azelaic acid
(7) Sebacic acid
(8) Isophthalic acid
(9) Endo-cis bicyclo (2.2.1)-5-heptene-2,3-dicarboxylic dianhydride
(10) Succinic anhydride
(11) Dodecenyl succinic anhydride
(12) Tetrahydrophthalic anhydride
(13) Hexahydrophthalic anhydride
(14) Maleic anhydride
(15) Phthalic anhydride
(16) Glutaric anhydride
(17) 1,4,5,6,7,7-hexachlorobicyclo-[2.2.1]-5-heptene-2,3-dicarboxylic anhydride
(18) Tetrachlorophthalic anhydride Suitable dianhydrides and polyanhydride chain extenders include the following:

TABLE III (1) 3,3',4,4'-benzophenone tetracarboxylic dianhydride
(2) Polyazelaic polyanhydride
(3) Pyromellitic dianhydride
(4) Pyromellitic dianhydride-glycol adducts
(5) 1,2,3-cyclopentanetertcarboxylic dianhydride Suitable diepoxide chain extenders include the following:

TABLE IV (1) Bis-epoxydicyclopentyl ether of ethylene glycol
(2) Epichlorohydrin/bis phenol A-type
(3) 1-epoxyethyl-3,4-epoxycyclohexane
(4) Dicyclopentadiene dioxide
(5) Limonene dioxide (6) Bis(2,3-epoxypropoxy)benzene
(7) Vinylcyclohexane dioxide
(8) 3,4-epoxy-6-methylcyclohexylmethyl-3,4-epoxy-6-methylcyclohexanecarboxylate
(9) Zeaxanthin diepoxide
(10) 9,10 - epoxy-12-hydroxyoctadecanoic acid, triester with glycerol.

Suitable diimine, diimide and triimide chain extenders include the following:

TABLE V (1) 1,6-hexane, N,N'-diethylenimine
(2) 1,6-hexane, N,N'-dipropylenimine
(3) 1,7-heptane, N,N'-diethylenimine
(4) 1,7-heptane, N,N'-dipropylenimine
(5) 1,8-octane, N,N'-diethylenimine
(6) 1,8-octane, N,N'-dipropylenimine
(7) 1,3-di(carboxy-N-propylenimide) benzene
(8) 1,3,5-tri (carboxy-N-propylenimide) benzene
(9) 1,3-di (ethylene-N-1,2,-butylimine) benzene By reacting the liquid polydienes with the chain extenders, an elastomeric material possessing a higher molecular weight may be obtained. The chain-extending reaction is carried out at ambient temperature or slightly elevated temperatures in a short period of time. Reaction temperatures and reaction times will vary according to the chain-extenders which are used, and it will be appreciated that the presence or absence of a catalyst for the chain-extending reaction will have a bearing upon the reaction conditions.

Important to the curing steps of the process are the aliphatic and aromatic peroxide free radical initiators. These peroxide initiators are instrumental in the cyclization of the pendant vinyl groups of the polydiene and the cross-linking of adjacent chains. The peroxide initiator is introduced into the initial mixture along with the polydiene prepolymer and the organic chain extender whereupon it becomes molecularly dispersed throughout the ensuing elastomeric polymer in a substantially unreacted condition. Upon the application of heat in the final step, the peroxide initiator decomposes to provide free radicals which force the pendant vinyl groups to join to form cross-linked, condensed cycloaliphatic chains.

The amount of peroxide initiator used in these resins will vary according to the peroxide initiator and the polydiene used. Generally, the amount of the peroxide employed will range between about 0.5% to 10% by weight of the prepolymer and more frequently within the range of about 2% to about 6%. Examples of typical organic peroxide which may be used in this process are listed in the following table:

TABLE VI (1) Di-t-butyl peroxide
(2) 2,5-dimethyl-2,5-bis(tertiary butylperoxy) hexane
(3) n-Butyl-4,4-bis(tertiary butylperoxy) valerate
(4) 2,5-dimethyl-2,5-bis(tertiary butylperoxy) hexyne-3
(5) Tertiary-butyl perbenzoate
(6) Dicumyl peroxide
(7) Methyl ethyl ketone peroxide
(8) Cumene hydroperoxide
(9) Di-N-methyl-t-butyl percarbamate
(10) Lauroyl peroxide
(11) Acetyl peroxide
(12) Decanoyl peroxide
(13) t-Butyl peracetate
(14) t-Butyl peroxyisobutyrate In order to modify the end properties of the resins, plasticizing compounds having reactive terminal vinyl groups are included as part of the resin formulation. Upon curing, the vinyl group of the plasticizer enters into the crosslinking chain between the terminal positions of adjacent polydiene chains whereupon rigid, semi-rigid, or flexible thermosetting plastics are produced. Among the more suitable plasticizers are the following alkenes, arylalkenes, aryl ether alkenes, and lower alkenyl esters:

TABLE VII 3-ethyl-1-pentene
2-methyl-1-hexene
3-methyl-1-hexene
4-methyl-1-hexene
5-methyl-1-hexene
3-methyl-1-pentene
1-dodecene
1-butene
2,3-dimethyl-1-butene
3,3-dimethyl-1-butene
2-ethyl-1-butene
2-ethyl-3-methyl-1-butene
2-methyl-1-butene
3-methyl-1-butene
1-decene
1-ethylene
1,1-diphenylethylene
1-heptene
1-hexene
1-pentene
2,3-dimethyl-1-pentene
2,4-dimethyl-1-pentene
3,3-dimethyl-1-pentene
2-ethyl-1-pentene
2-methyl-1-pentene
3-methyl-1-pentene
4-methyl-1-pentene
1-propene
2-methyl-1-propene
Styrene
1-tetradecene
1,3-decadiene
2,6-dimethyl-1,3-heptadiene
1,5-hexadiene
2-methyl-1,3-butadiene
1,4-pentadiene
1-octene
1,3-butadiene
2,3-dimethyl-1,3-butadiene
3-ethoxypropene
3-methyl-1-(2-propenoxy)-butane
3-methoxypropene
2-(2-propenoxy) naphthalene
2-(2-propenoxy) toluene
3-(2-propenoxy) toluene
4-(propenoxy) toluene
10-undecanoic esters
Propenoic esters
Atropic esters
3-butenoic esters
2-methylpropenoic esters
Vinyl acetate
Vinyl acrylate It is apparent that a wide variety of compounds may be used as plasticizers. Selection of the plasticizer will be conditioned upon the properties desired in the end product. Accordingly, where a high humidity resistance is desired, hydrocarbon compounds are chosen. Ethers and esters also provide suitable plasticizer compounds when properties exhibited by those compounds are desired.

Of special interest as a plasticizer is styrene. Styrene which is ordinarily a volatile compound, undergoes a change in the elastomeric state of the polymer whereby it is no longer volatile. When styrene is used as the plasticizer, the intermediate elastomeric material need not be stored in sealed containers, but may be left open to the air with no concern for evaporation of the syrene. It is believed that on curing to the final cyclized resin, the vinyl group on the styrene attaches across the ends of adjacent condensed cycloaliphatic ring chains. The final product is attractive from the fact that styrene makes a more economical resin without sacrifice of the basic properties, and indeed, the final product displays a much better dimensional stability under adverse conditions than most other resins.

To prepare these resins, it is preferrer to mix the polyfunctional polydiene with the polyfunctional organic chain-extender in approximately stoichiometric proportions. It should be understood, however, that the purpose for using a chain-extender is to increase the molecular weight of the intermediate elastomer, and therefore, as the molecular weight of the starting polydiene material is increased, the amount of the polyfunctional organic chain extender which is used may be proportionately decreased. Thus, while approximately stoichiometric proportions of polydiene and the chain-extender are preferred when the polydiene which is employed has a molecular weight of between 500 and 3,000, smaller amounts of the organic chain-extender may be used when employing polydienes having a higher molecular weight of, e.g., 15,000 and up. Additionally, the amount of the chain-extender which may be used will also be dependent upon the functionality of the polydiene being employed. Thus a polydiene having a functionality of 2 will require more of the chain-extender than a polydiene having a functionality of 1.5. Other adjustments in the proportions may be necessary when other ingredients such as copolymers are employed.

After the ingredients have been mixed, the polymeric liquid should desirably be degassed in vacuum to remove entrapped air and volatile impurities. A chain extending reaction proceeds at room temperature or moderately elevated temperatures to produce an elastomeric intermediate compound characterized by having the peroxide free radical initiator dispersed throughout. The chain extension reaction may be catalyzed to reduce reaction temperature or time by catalytic agents which are standard art, providing they do not interfere with the subsequent cyclization and cross-linking step. While the polymer is in this elastomeric state it may be easily handled and fabricated. When the final article has been constructed, the rubbery intermediary is heated in the range of 150° F. to 400° F. whereupon cyclization and cross-linking takes place to produce a transparent plastic which may be rigid, semi-rigid, or flexible and is resistant to impact. Rapid heating of the reactants to elevated temperatures may cause two reactions to occur simultaneously, and this situation is desirably avoided since a step-wise cure is preferred.

The chemical structure of the resin product obtained by reacting 1,2-polybutadienediol, styrene, and 2,4-toluene diisocyanate is represented ideally as follows:

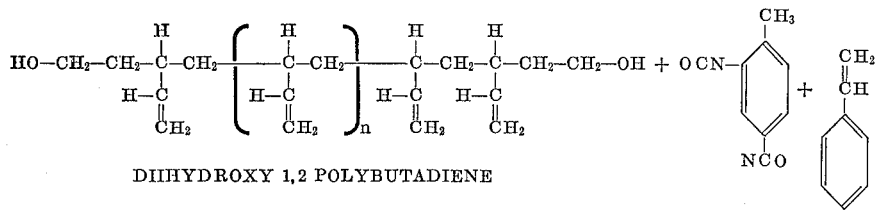

DIHYDROXY 1,2 POLYBUTADIENE                    TOLUENE DIISOCYANATE    STYRENE

| CHAIN EXTENSION TO FORM
| POLYURETHANE ELASTOMER
↓ INTERMEDIATES

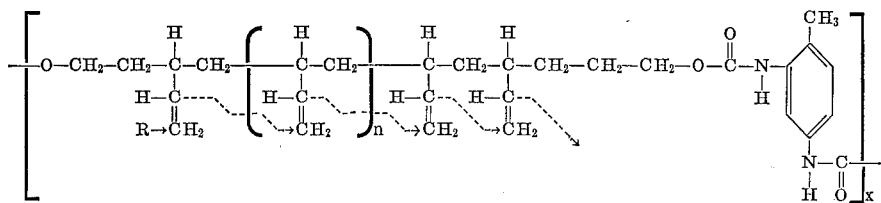

| R:R—2R·
| CYCLIZATION OF THE PENDANT
↓ VINYL AND CROSS-LINKING + STYRENE

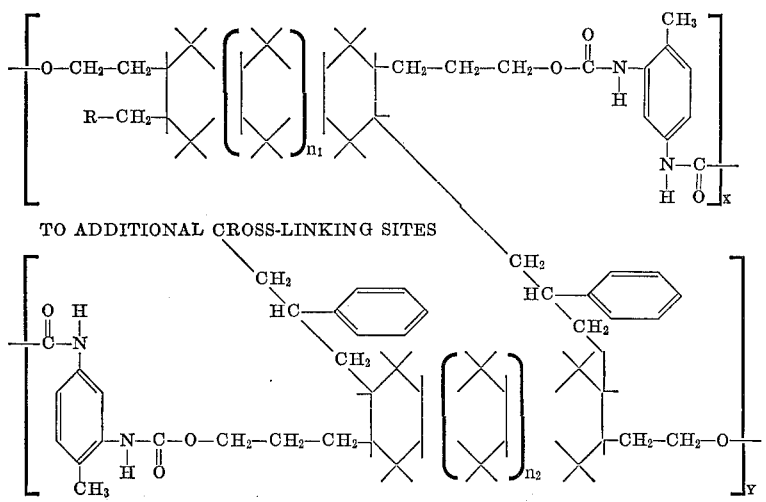

The following specific embodiments will further illustrate this invention and are not intended to be limiting:

EXAMPLES

Example I

Thirty parts of 1,2-polybutadienediol having an average molecular weight of 2000 and 3 parts of 1,5-hexadiene were placed in a glass vessel and mixed thoroughly. Three parts toluene diisocyanate were added to the vessel and stirred, followed by the addition of 0.6 part di-t-butyl peroxide. The solution was stirred until it became homogenous. The solution was degassed in a vacuum chamber at an applied vacuum of about 1 mm. of Hg for approximately five minutes. At the end of the degassing period, the material was poured into a mold and cured under these sets of conditions: (1) six days at 90° C. in air, (2) fifteen days at 115° C. in air, and (3) fourteen days at 170° C. in vacuum. The cured resins were clear, transparent, hard, and yellow in color. A typical casting had a Barcol hardness of 37.

Example II

Twenty parts of 1,2-polybutadienediol having an average molecular weight of 2000 and 2 parts of 1-octene were placed in a glass vessel and mixed thoroughly. Two parts toluene diisocyanate were added to the vessel and stirred, followed by the addition of 0.4 part di-t-butyl peroxide. The solution was stirred until it became homogeneous. The degassing operation was conducted according to Example I. At the end of the degassing period the material was poured into a mold and cured under these sets of conditions: (1) fifteen days at 90° C. in air, (2) ten days at 115° C. in air, and (3) nine days at 170° C. in vacuum. The cured resins were clear, transparent, hard and light yellow in color. Resins processed in the above manner had the following physical properties:

Hardness: 22 to 27 Barcol units
Specific heat: 0.352
Incipient decomposition temperature: 466° C.

Example III

Seven parts of 1,2-polybutadienediol having an average molecular weight of 2000 and 0.05 part triethylenediamine polyurethanation catalyst were placed in a glass vessel, and the constituents gently warmed and stirred until the triethylenediamine was in solution. The vessel and its contents were cooled to room temperature and the following amounts of material were added and mixed in this order:

| | Parts |
|---|---|
| (1) 1-octene | 3 |
| (2) Di-t-butyl peroxide | 0.2 |
| (3) Toluene diisocyanate | 0.7 |

The degassing of the material was carried out as outlined in Example I, then the material was poured into a mold and cured under these sets of conditions: (1) three days at 24° C. in air, (2) two days at 90° C. in air, (3) ten days at 115° C. in air, and (4) ten days at 170° C. in vacuum. The cured resins were clear, transparent, yellow in color, flexible and had a Barcol hardness ranging from 0 to 3.

Example IV

Eighteen parts 1,2-polybutadienediol having an average molecular weight of 2000, 0.05 part triethylenediamine, 2 parts were formulated and degassed as described in Example II. The material was then poured into molds and cured at these sets of conditions: (1) two days at 90° C. in air, (2) one day at 115° C. in air, and (3) 1.5 hours at 170° C. in air. The materials, upon removal from the molds, were in the form of $\frac{1}{32}$-inch sheets. The cured resins were clear, transparent, light yellow in color and had a hardness in the range of 15 to 20 Barcol units. The plastic sheets exhibited remarkable thermal shock resistance when placed directly into liquid nitrogen from room temperature.

Example V

Twenty parts of 1,2-polybutadienediol having an average molecular weight of 2000 and 2 parts of 10-undecenoic acid were placed in a glass vessel and mixed thoroughly. Di-t-butyl peroxide in the amount of 0.4 part was stirred into the solution. Two parts of toluene diisocyanate were added to the vessel and the solution stirred until it became homogeneous. Degassing of the solution was carried out as described in Example I. The degassed material was poured into a mold and cured under these sets of conditions: (1) fourteen days at 90° C. in air, (2) seven days at 115° C. in air, and (3) eleven days at 170° C. in vacuum. The cured resins were clear, transparent, hard and yellow in color. A typical cast had the following physical properties.

Hardness: 32 Barcol units
Specific heat: 0.385
Incipient decomposition temperature: 468° C.

The attractiveness of these resins will be readily apparent to those skilled in the art. Resins according to this invention are prepared from viscous polymeric materials, but unlike other polymeric materials, the curing can be stopped at an intermediate stage for an indefinite period. The intermediate stage is an elastomeric material which can be readily cut, punched, shaped, or subjected to almost any mechanical fabrication. When the final article is shaped, heat is applied and the article forms into the rigid, semi-rigid, or flexible resinous material.

The resins may be mixed and reacted to the intermediate elastomeric stage at a central factory, then packaged and shipped to the place of use. It is readily seen that such methods of manufacture will permit heretofore unobtainable uniformity in resin products.

We claim:
1. A thermosetting internally plasticized polydiene elastomeric resin comprising:
    (A) the reaction products of (1) a polydiene having
        (i) polyfunctional groups selected from the group consisting of hydroxyl, carboxyl, and amino and (ii) a predominant amount of vinyl groups on alternate carbon atoms on the polydiene backbone, (2) an internal plasticizer having at least one reactive vinyl group, and (3) a polyfunctional organic chain extender which is capable of reacting with the functional groups on the polydiene and
    (B) dispersed through (A) a peroxide free radical initiator substantially unreacted.
2. A resin according to claim 1 wherein the chain extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.
3. A resin according to claim 1 wherein the chain extender capable of reaction with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aromatic compounds.
4. A resin according to claim 1 wherein the chain extender capable of reaction with the amino functional groups on the polydiene is selected from the group consisting of (a) diisocyanate substituted aliphatic compounds, (b) disocyanate substituted aromatic compounds, (c) anhydride substituted aliphatic compounds, (d) an- hydride substituted aromatic compounds, (e) dianhydride substituted aliphatic compounds, (f) dianhydride substituted aromatic compounds, (g) dicarboylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

5. A resin according to claim 1 wherein the polydiene is selected from the group consisting of 1,2-polybutadiene and 3,4-polyisoprene.

6. A resin according to claim 1 wherein the internal plasticizer containing at least one vinyl group is selected from the group consisting of alkenes, arylether alkenes, arylalkenes and lower alkenyl esters.

7. A thermoset interally plasticized polydiene resin comprising a reaction product cured in the presence of a peroxide free radical initiator, the product of reaction of (A) a polydiene having (1) polyfunctional groups selected from the group consisting of hydroxyl, carboxyl, and amino and (2) a predominant amount of vinyl groups on alternate carbon atoms on the polydiene backbone, (B) an internal plasticizer having at least one reactive vinyl group, and (C) a polyfunctional organic chain extender which is capable of reacting with the functional groups of the polydiene.

8. A resin according to claim 7 wherein the chain extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds (d) diacid halide substituted aromatic compounds, (e) dicarboxylic acid substitued aliphatic compounds, (f) dicarboxylic acid substituted aromatic compounds, (g) diester substituted aliphatic compounds, and (h) diester substituted aromatic compounds.

9. A resin according to claim 7 wherein the chain extender capable of reaction with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

10. A resin according to claim 7 wherein the chain extender capable of reaction with the amino functional groups on the polydiene is selected from the group consisting of (a) diisocyanate substituted aliphatic compounds, (b) diisocyanate substituted aromatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds (m) diepoxide substituted aliphatic compounds, and (n) diepoxide substituted aromatic compounds.

11. A resin according to claim 7 wherein the polydiene is selected from the group consisting of 1,2-polybutadiene and 3,4-polyisoprene.

12. A resin according to claim 7 wherein the internal plasticizer containing at least one vinyl group is selected from the group consisting of alkenes, arylether alkenes, arylalkenes, and lower alkenyl esters.

13. A method of producing a thermoset internally plasticized polydiene resin comprising:

reacting in the presence of a peroxide free radical initiator, (A) a polydiene having (1) polyfunctional groups selected from the group consisting of hydroxyl, carboxyl, and amino and (2) a predominant amount of vinyl groups on alternate carbon atoms of the polydiene backbone with (B) an organic chain extender capable of reacting with the functional groups on the polydiene and (C) an internal plasticizer having at least one reactive vinyl group to produce an elastomeric material having the peroxide dispersed therethrough substantially unreacted, and subsequently curing the elastomer to produce a thermoset resin.

14. A method according to claim 13 wherein the chain extender capable of reaction with the hydroxyl functional groups on the polyydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substitued aliphatic compounds, and (h) diester substituted aromatic compounds.

15. A method according to claim 13 wherein the chain extender capable of reaction with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

16. A method according to claim 13 wherein the chain extender capable of reaction with the amino functional groups on the polydiene is selected from the group consisting of (a) diisocyanate substituted aliphatic compounds, (b) diisocyanate substituted aromatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

17. A method according to claim 13 wherein the polydiene is selected from the group consisting of 1,2-polybutadiene and 3,4-polyisoprene.

18. A method according to claim 13 wherein the internal plasticizer containing at least one vinyl group is selected from the group consisting of alkenes, arylether alkenes, arylalkenes, and lower alkenyl esters.

References Cited

UNITED STATES PATENTS 2,877,212   3/1959   Seligman _____ 260—77.5 CR

OTHER REFERENCES

"Product Data Bulletin No. 505," published by Sinclair Petrochemicals, Inc., issued May 1, 1965 (46 pages).

DONALD E. CZAJA, Primary Examiner

M. J. WELSH, Assistant Examiner

U.S. Cl. X.R.

260—2 EP, 2 EN, 47 CB, 75 R, 75 A, 94.7 A, 94.7 N, 859 R